United States Patent
Liu et al.

(10) Patent No.: US 9,435,929 B2
(45) Date of Patent: Sep. 6, 2016

(54) BACK LIGHT MODULE

(71) Applicants: Ming-Dah Liu, Hsin-Chu (TW);
Chin-Ming Lin, Hsin-Chu (TW);
Sze-Ke Wang, Hsin-Chu (TW)

(72) Inventors: Ming-Dah Liu, Hsin-Chu (TW);
Chin-Ming Lin, Hsin-Chu (TW);
Sze-Ke Wang, Hsin-Chu (TW)

(73) Assignee: YOUNG LIGHTING TECHNOLOGY INC., Hsin-Chu (TW)

( * ) Notice: Subject to any disclaimer, the term of this patent is extended or adjusted under 35 U.S.C. 154(b) by 76 days.

(21) Appl. No.: 14/305,573

(22) Filed: Jun. 16, 2014

(65) Prior Publication Data
US 2014/0376261 A1    Dec. 25, 2014

(30) Foreign Application Priority Data
Jun. 20, 2013   (CN) .......................... 2013 1 0247187

(51) Int. Cl.
*F21V 8/00*      (2006.01)

(52) U.S. Cl.
CPC ............. *G02B 6/0031* (2013.01); *G02B 6/003* (2013.01); *G02B 6/0068* (2013.01); *G02B 6/0036* (2013.01); *G02B 6/0043* (2013.01)

(58) Field of Classification Search
CPC .. G02B 6/0031; G02B 6/003; G02B 6/0068; G02B 6/0036; G02B 6/0043; G02B 6/0073; G02B 6/0011; G02B 6/0018; G02B 6/0055; F21Y 2101/02; G02F 1/133603; G02F 1/133615; F21V 2200/20
See application file for complete search history.

(56) References Cited

U.S. PATENT DOCUMENTS

| | | | | |
|---|---|---|---|---|
| 6,164,789 A * | 12/2000 | Unger | ................. | G02B 6/0028 362/23.16 |
| 6,697,042 B1 * | 2/2004 | Cohen | ................. | G02B 6/0068 345/102 |
| 7,507,012 B2 * | 3/2009 | Aylward | .............. | G02B 6/0028 362/624 |
| 8,317,386 B2 * | 11/2012 | Nagata | ................... | G02B 6/003 359/216.1 |
| 8,425,104 B2 * | 4/2013 | Shin | ..................... | G02B 6/0061 349/65 |
| 2008/0158477 A1 * | 7/2008 | Hsiao | ................... | G02B 6/0031 349/65 |
| 2009/0190070 A1 | 7/2009 | Nagata et al. | | |
| 2010/0060172 A1 * | 3/2010 | Ikebe | ..................... | G02B 6/003 315/152 |

FOREIGN PATENT DOCUMENTS

| | | |
|---|---|---|
| CN | 101311756 A | 11/2008 |
| CN | 101529321 A | 9/2009 |
| CN | 101652605 A | 2/2010 |

(Continued)

OTHER PUBLICATIONS

China Patent Office Office Action issued Jul. 4, 2016, China.

*Primary Examiner* — Bao Q Truong
(74) *Attorney, Agent, or Firm* — WPAT, PC; Justin King

(57) ABSTRACT

A back light module includes a light guide plate, at least one first light source, at least one second light source and at least one first reflection element. The light guide plate includes a first light incident surface, a second light incident surface opposite to the first light incident surface, a light emitting surface, and a bottom surface opposite to the light emitting surface. The first light source is disposed beside the first light incident surface and suitable to provide a first non-collimated light beam to the first light incident surface. The second light source is disposed beside the second light incident surface and suitable to provide a first collimated light beam to the second light incident surface. The first reflection element is disposed beside the first light incident surface to reflect the first collimated light beam emitted so as to make the first collimated light beam diverge.

25 Claims, 12 Drawing Sheets

(56) References Cited

FOREIGN PATENT DOCUMENTS

| CN | 201661930 U | 12/2010 |
|---|---|---|
| CN | 102472860 A | 5/2012 |
| CN | 102943980 A | 2/2013 |
| JP | 2006-164587 A | 6/2006 |
| TW | M322560 U | 11/2007 |
| TW | 201122667 | 7/2011 |
| TW | I356204 | 1/2012 |
| TW | 201234090 | 8/2012 |
| TW | I375085 | 10/2012 |

* cited by examiner

BACK LIGHT MODULE

FIELD OF THE INVENTION

The present invention relates to a back light module, and more particularly to a back light module having a light guide plate to which a collimated light beam and a non-collimated light beam are both manipulated.

BACKGROUND OF THE INVENTION

The back light module, also known as the back light source, is an important element of the thin film transistor liquid crystal display (TFT-LCD). The back light module is necessary to provide light beams because the TFT-LCD is a non-self-emitting display panel. The light beams is passed through a first polarizing plate, a first glass substrate, a liquid crystal layer, a color filter, a second glass substrate and a second polarizing plate in order of a TFT-LCD panel. Thus, the light beams are converted into images to user's eyes. So that, a user could see images displayed by the thin film transistor liquid crystal display.

Generally, the back light modules can be classified into the edge-type (edge lighting) back light module and the direct-type (bottom lighting) back light module. The edge-type back light module includes a reflector, light sources (such as cold cathode fluorescent lamps or light emitting diodes), a light guide plate, optical films (such as a diffuser sheet, a prism sheet, and so on). Recently, the light emitting diodes are commonly applied to the edge-type back light module to serve as the light sources. However, if the light emitting diodes are cooperated with laser light sources, the TFT-LCD will have better light emitting efficiency and a larger color gamut.

At present, there are two conventional ways to apply the light emitting diodes and laser diodes simultaneously as the light sources to the edge-type back light module. In one way, the light emitting diodes and the laser diodes are mounted on a same circuit board so as to form a light bar. However, numbers of the light emitting diodes and the laser diodes mounted on the circuit board are limited by the mounting space of the circuit board, thus the light sources can't provide enough brightness for the edge-type back light module. In another way, the edge-type back light module includes two light guide plates, wherein the two light guide plates overlap with each other. The light emitting diodes are disposed beside one of the light guide plates, and the laser diodes are disposed beside the other one of the light guide plates, so that the numbers of the light emitting diodes and the laser diodes can be increased. However, in this way, the manufacturing cost and the thickness of the back light module are increased. In addition, if the two light guide plates have different luminance distribution, a chromaticity is varied in different regions. U.S. Pat. No. 7,303,322 discloses a "multiple lightguide backlight" which also has above problems, that is, the manufacturing cost is high, and a chromaticity is varied in different regions due to the two light guide plates having different luminance distribution. Therefore, to resolve or improve above problems has become a main topic in this field of technology.

SUMMARY OF THE INVENTION

The present invention provides a back light module having a light guide plate cooperated with two kinds of light sources simultaneously, so as to improve light emitting efficiency and reduce manufacturing cost.

The present invention also provides a back light module having a light guide plate cooperated with a collimated light beam and a non-collimated light beam simultaneously, so as to improve light emitting efficiency and reduce manufacturing cost.

To achieve at least one of above advantages, a back light module is provided according to an embodiment of the present invention. The back light module includes a light guide plate, at least one first light source, at least one second light source and at least one first reflection element. The light guide plate includes a first light incident surface, a second light incident surface opposite to the first light incident surface, a light emitting surface, and a bottom surface opposite to the light emitting surface. The light emitting surface connects the first light incident surface and the second light incident surface. The bottom surface connects the first light incident surface and the second light incident surface. The at least one first light source is disposed beside the first light incident surface. The first light source is suitable to provide a first non-collimated light beam to the first light incident surface. The at least one second light source is disposed beside the second light incident surface. The second light source is suitable to provide a first collimated light beam to the second light incident surface. The at least one first reflection element is disposed beside the first light incident surface. The first reflection element is suitable to reflect the first collimated light beam emitted from the second light source so as to make the first collimated light beam diverge.

In an embodiment of the present invention, the first light source is a light emitting diode, and the second light source is a laser diode.

In an embodiment of the present invention, the first light source is a light emitting diode, and the second light source is an assembly of a light emitting diode and a collimator lens.

In an embodiment of the present invention, a number of the first light source is plurality, a number of the second light source is plurality, and at least one of the first light sources corresponds to one of the second light sources.

In an embodiment of the present invention, a number of the first light source is plurality, a number of the second light source is plurality. There is a gap between two adjacent first light sources, and at least one of the second light sources corresponds to the gap.

In an embodiment of the present invention, the light guide plate is rectangular, the first light incident surface includes a first corner, the second light incident surface includes a second corner, the first corner and the second corner are respectively disposed at two ends of a diagonal line of the light guide plate, the at least one first light source is disposed at the first corner, and the at least one second light source is disposed at the second corner.

In an embodiment of the present invention, the first light incident surface further comprises a third corner, the second light incident surface further comprises a fourth corner, the third corner and the fourth corner are respectively disposed at two ends of another diagonal line of the light guide plate, a number of the first light source is two, a number of the second light source is two, the other first light source is disposed at the third corner, and the other second light source is disposed at the fourth corner.

In an embodiment of the present invention, a number of the at least one second light source is greater than or equal to two, the light guide plate is rectangular, the second light incident surface has a second corner and a fourth corner, the second corner and the fourth corner are connected to the second light incident surface, and at least two of the second light sources are respectively disposed at the second corner and the fourth corner.

In an embodiment of the present invention, the light guide plate further includes a plurality of microstructures disposed on the bottom surface, and a distribution density of the microstructures increases gradually along a direction from the first light incident surface toward the second light incident surface.

In an embodiment of the present invention, the back light module further includes a light-converting structure disposed on the light guide plate, wherein the light-converting structure is suitable to receive the first collimated light beam emitted from the second light source and convert a color of the first collimated light beam.

In an embodiment of the present invention, the light-converting structure includes phosphor.

In an embodiment of the present invention, the back light module further includes an optical structure, wherein the optical structure is disposed between the second light source and the second light incident surface, the optical structure includes a plurality of lenticular lenses, a longitudinal direction of each lenticular lens is parallel to a first extension direction, a number of the first reflection element is plurality, each first reflection element is a stripe-shaped convex micro mirror, a longitudinal direction of each first reflection element is parallel to a second extension direction, the first extension direction is perpendicular to the light emitting surface, and the second extension direction is parallel to the second light incident surface and perpendicular to the first extension direction.

In an embodiment of the present invention, the first reflection element is a convex mirror.

In an embodiment of the present invention, the first reflection element is a convex micro mirror array.

In an embodiment of the present invention, a number of the first reflection element is plurality, a number of the first light source is plurality, and each first reflection element is disposed between two adjacent first light sources.

In an embodiment of the present invention, the first reflection element includes a concave surface of the light guide plate and a refection layer coated on the concave surface, and the concave surface is concaved in the light guide plate and connected the light emitting surface and the second light incident surface.

In an embodiment of the present invention, the back light module further includes at least one third light source, at least one fourth light source, and at least one second reflection element. The third light source is disposed beside a third light incident surface of the light guide plate, and the at least one third light source is suitable to provide a second non-collimated light beam to the third light incident surface. The fourth light source is disposed beside a fourth light incident surface of the light guide plate, and the fourth light incident surface is opposite to the third light incident surface. The at least one fourth light source being suitable to provide a second collimated light beam to the fourth light incident surface. The third light incident surface connects the first light incident surface and the second light incident surface, and the fourth light incident surface connects the first light incident surface and the second light incident surface. The second reflection element is disposed beside the third light incident surface, and the second reflection element is suitable to reflect the second collimated light beam emitted from the fourth light source to make the second collimated light beam diverge.

In an embodiment of the present invention, the third light source is a light emitting diode, and the fourth light source is a laser diode.

In an embodiment of the present invention, the third light source is a light emitting diode, and the fourth light source is an assembly of a light emitting diode and a collimator lens.

In an embodiment of the present invention, a number of the third light source is plurality, a number of the fourth light source is plurality, and at least one of the third light sources corresponds to one of the fourth light sources.

In an embodiment of the present invention, a number of the third light source is plurality, a number of the fourth light source is plurality, there is a gap between two adjacent third light sources, and at least one of the fourth light sources corresponds to the gap.

In an embodiment of the present invention, the second reflection element is a convex mirror.

In an embodiment of the present invention, the second reflection element is a convex micro mirror array.

In an embodiment of the present invention, the back light module further includes at least one third reflection element, wherein the third reflection element is disposed beside the second light incident surface, and the third reflection element is suitable to reflect the first non-collimated light beam emitted from the first light source.

In an embodiment of the present invention, a number of the third reflection element is plurality, a number of the second light source is plurality, and each third reflection element is disposed between two adjacent second light sources.

In an embodiment of the present invention, the third reflection element is a convex mirror.

In an embodiment of the present invention, the third reflection element is a convex micro mirror array.

The back light module of the present invention has the first light source (e.g. the light emitting diode) and the second light source (e.g. the laser diode) respectively disposed beside two opposite surfaces (e.g. the first light incident surface and the second light incident surface) of the light guide plate. The first reflection element is disposed near the second light source (i.e. beside the second light incident surface). The collimated light beam emitted from the second light source is transmitted to the first light incident surface via the light guide plate, then the collimated light beam is reflected by the first reflection element. The reflected collimated light beam is diverged in the light guide plate so as to be uniformly mixed with the non-collimated light beam emitted from the light emitting diode. Therefore, the back light module can provide a surface light source with high brightness and excellent uniformity. In this configuration, the light emitting diode and the laser diode served as the light sources can be disposed simultaneously beside a light guide plate, wherein another light guide plate is omitted in the prior art. In addition, in the embodiment of applying one light guide plate, a chromaticity variation caused by two overlap light guide plates having different luminance distribution is avoided.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
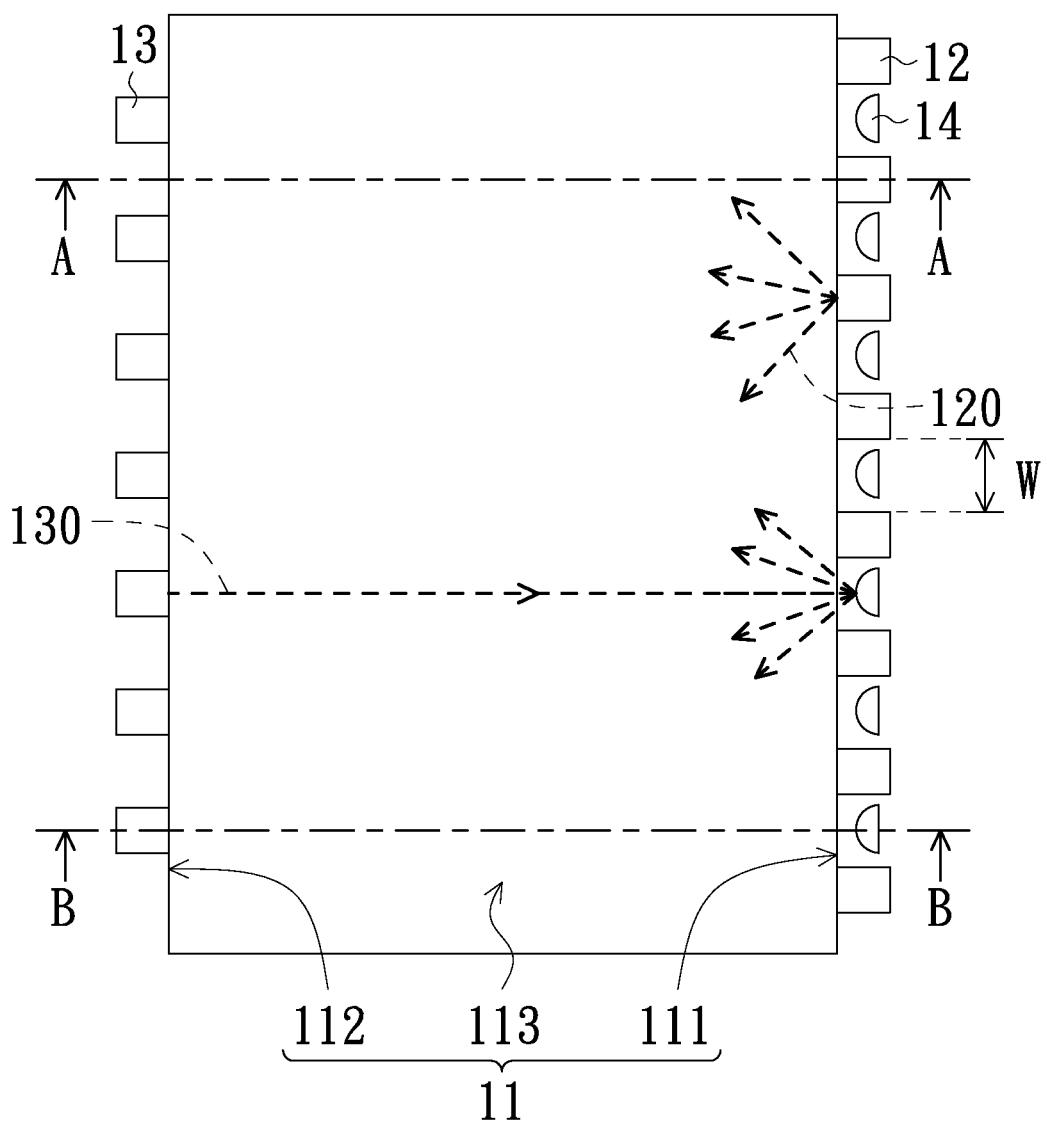
FIG. 1 is a schematic, top view of a back light module according to one embodiment of the present invention.
Figure 2:
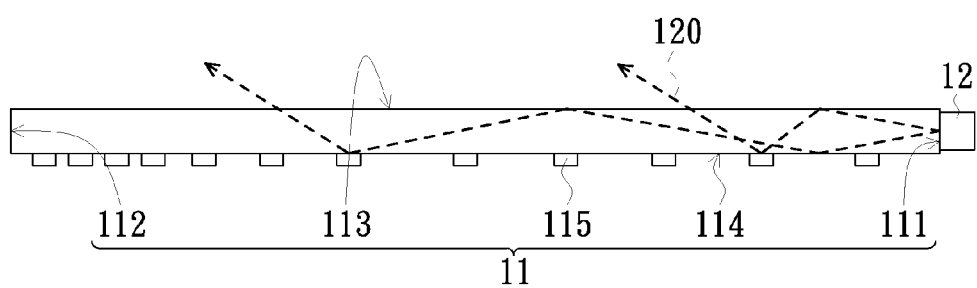
FIG. 2 is a schematic, cross-sectional view taken along line A-A of FIG. 1.
Figure 3:
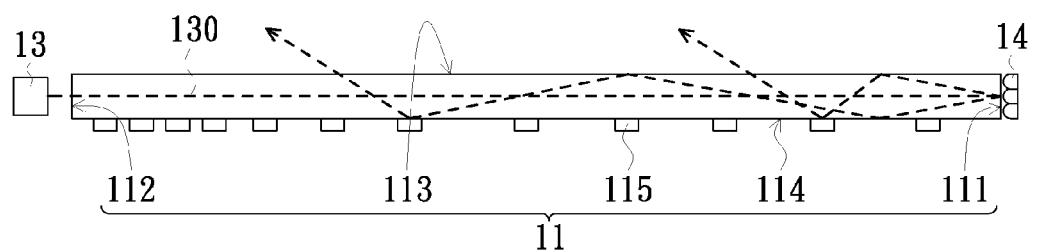
FIG. 3 is a schematic, cross-sectional view taken along line B-B of FIG. 1.

FIG. 1 is a schematic, top view of a back light module according to one embodiment of the present invention. FIG. 2 is a schematic, cross-sectional view taken along line A-A of FIG. 1. FIG. 3 is a schematic, cross-sectional view taken along line B-B of FIG. 1. Referring to FIG. 1, the back light module according to this embodiment of the present invention includes a light guide plate 11, at least one first light source 12, at least one second light source 13 and at least one first reflection element 14. The light guide plate 11 includes a first light incident surface 111, a second light incident surface 112 and a light emitting surface 113. The first light incident surface 111 is opposite to the second light incident surface 112. The light emitting surface 113 connects the first light incident surface 111 and the second light incident surface 112. The first light source 12 is disposed beside the first light incident surface 111 and suitable to provide a first non-collimated light beam 120 to the first light incident surface 111. The second light source 13 is disposed beside the second light incident surface 112 and suitable to provide a first collimated light beam 130 to the second light incident surface 112. The first reflection element 14 is disposed beside the first light incident surface 111 and suitable to reflect the first collimated light beam 130 emitted from the second light source 13, so as to make the first collimated light beam 130 diverge.

Referring to FIG. 1, in this embodiment, there are a plurality of the first reflection elements 14, a plurality of the first light sources 12, and a plurality of the second light sources 12. Each reflection element 14 is disposed between two adjacent first light sources 12. In other words, there is a gap W between two adjacent first light sources 12, and the first reflection elements 14 are respectively disposed in the gaps W. Each second light source 13 corresponds to one of the first reflection elements 14 and one of the gaps W. In this embodiment, each first reflection element 14 may be a single convex mirror, or a convex micro mirror array composed of a plurality of convex micro mirrors. The single convex mirror and the convex micro mirror array can reflect the first collimated light beam 130 emitted from the second light source 13 and make the first collimated light beam 130 diverge. The single convex mirror or the convex micro mirror array can be used as the first reflection element 14 according to the design requirement of the product, however, the invention is not limited thereto. The first reflection element 14 is not limited to be the single convex mirror or the convex micro mirror array. In this embodiment, the first light source 12 may be a light emitting diode, and the second light source 13 may be a laser diode. The first collimated light beam 130 emitted from the second light source 13 may be a laser light beam having characteristics of high collimation and high directivity, however, the invention is not limited thereto. It is worth noting that the second light source 13 in this embodiment is not limited to the laser diode. The second light source 13 also can be an assembly of a light emitting diode and a collimator lens, which also can emit the collimated light beam.

Referring to FIGS. 2 and 3, the light guide plate 11 of the back light module 1 further includes a bottom surface 114 and a plurality of microstructures 115. The bottom surface 114 is opposite to the light emitting surface 113 and connects the first light incident surface 111 and the second light incident surface 112. The microstructures 115 are disposed on the bottom surface 114 of the light guide plate 11. The microstructures 115 are configured to destroy the total internal reflection of the light beams in the light guide plate 11, so that the first non-collimated light beam 120 and the first collimated light beam 130 reflected by the first reflection element 14 can leave the light guide plate 11 through the light emitting surface 113. In this embodiment, a distribution density of the microstructures 115 is increased gradually along a direction from the first light incident surface 111 toward the second light incident surface 112. In other words, the distribution density of the microstructures 115 adjacent to the first light source 12 is lower than the distribution density of the microstructures 115 adjacent to the second light source 13. The brightness of the back light module 1 can be further uniformed by adjusting the distribution density of the microstructures 115. In this embodiment, the microstructures 115 may be reflective material printed on the bottom surface 114 of the light guide plate 11 or micro protrusion dots formed on the bottom surface 114 of the light guide plate 11 by injection molding, however, the invention is not limited thereto, the form of the microstructures 115 are decided according to the design requirement of the product.

It is worth noting that, in this embodiment, the first reflection element 14 is, for example, a convex mirror or a convex micro mirror array, so that when the first collimated light beam 130 emitted from the second light source 13 is reflected by the first reflection element 14, then the first collimated light beam 130 is diverged in different directions. Referring to FIGS. 1 and 3, the first collimated light beam 130 reflected by the first reflection element 14 is diverged in a direction parallel to the light emitting surface 113 (or the bottom surface 114) of the light guide plate 1 and a direction parallel to the first light incident surface 111 (or the second light incident surface 112). Specifically, the paths of the reflected collimated light beams 130 shown in FIGS. 1 and 3 are just taken for example. In fact, the diverging directions of the first collimated light beam 130 reflected by the first reflection element 14 are not limited to the direction parallel to the light emitting surface 113 of the light guide plate 11 and the direction parallel to the first light incident surface 111 of the light guide plate 11.

Figure 4:
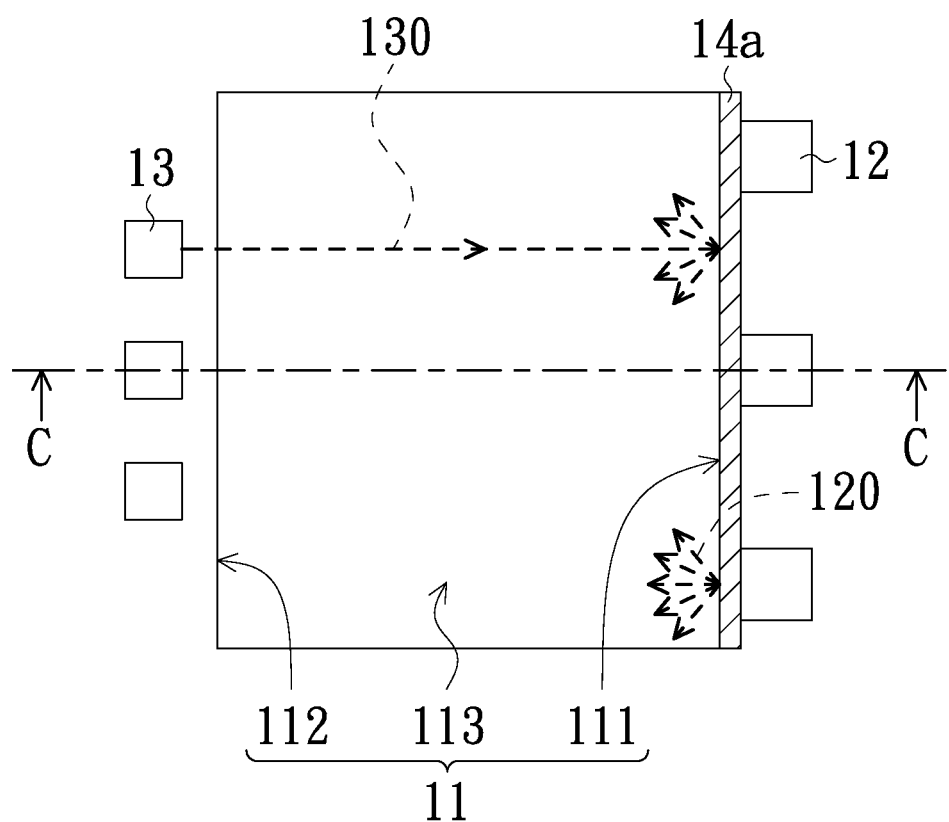
FIG. 4 is a schematic, top view of a back light module according to another embodiment of the present invention.
Figure 5:
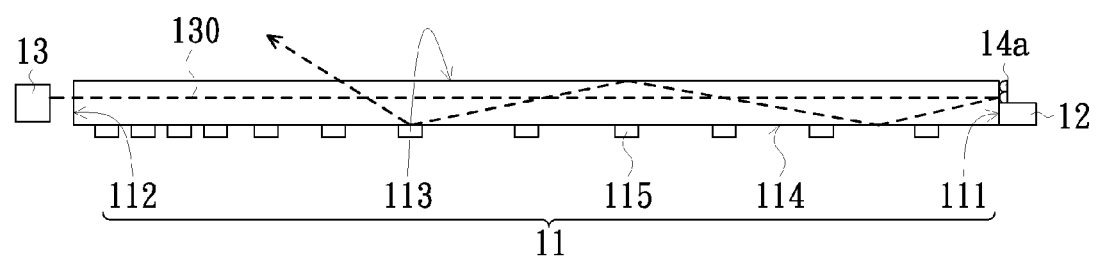
FIG. 5 is a schematic, cross-sectional view taken along line C-C of FIG. 4.

FIG. 4 is a schematic, top view of a back light module according to another embodiment of the present invention. FIG. 5 is a schematic, cross-sectional view taken along line C-C of FIG. 4. Referring to FIGS. 4 and 5, the back light module 1a in this embodiment is similar to the back light module 1 shown in FIGS. 1 to 3. In this embodiment, each first reflection element 14a of the back light module 1a is a stripe-shaped convex micro mirror array disposed beside the first light incident surface 111 and above the first light source 12. Specifically, the position of the first reflection element 14a in this embodiment is just one embodiment of the present invention, and the invention is not limited thereto. The first reflection element 14a also can be disposed under the first light source 12 so as to reflecting the first collimated light beam 130.

Figure 6:
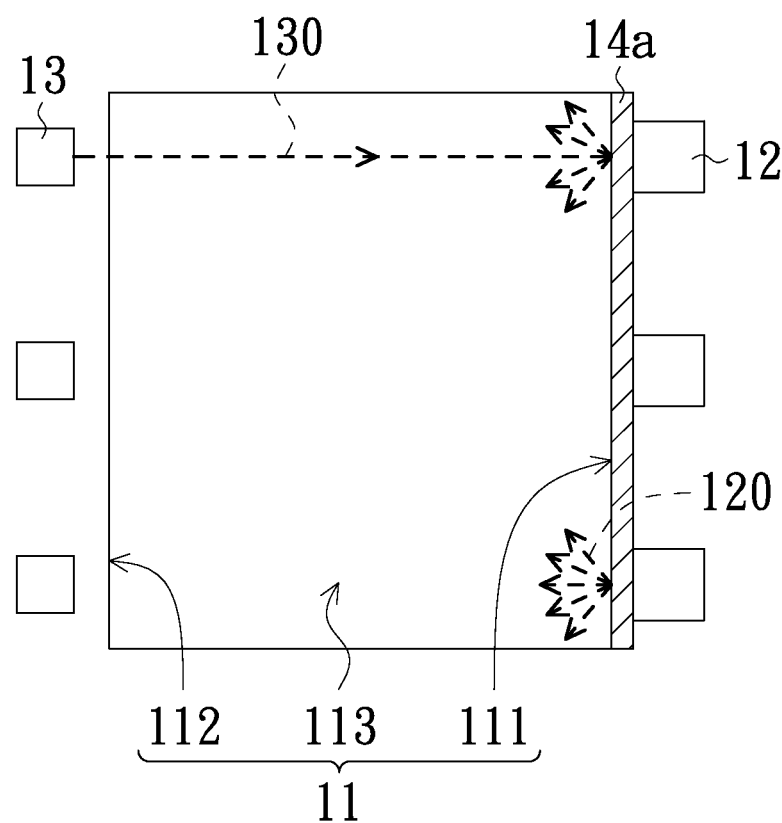
FIG. 6 is a schematic, top view of a back light module according to another embodiment of the present invention.

FIG. 6 is a schematic, top view of a back light module according to another embodiment of the present invention. Referring to FIG. 6, the back light module 1b in this embodiment is similar to the back light module 1a shown in FIGS. 4 and 5. In this embodiment, each second light source 13 corresponds to the first reflection element 14a disposed above or under the corresponding first light source 12. The other elements of the back light module 1b in this embodiment are similar to the back light module 1a shown in FIGS. 4 and 5, and the detailed description is omitted.

Figure 7:
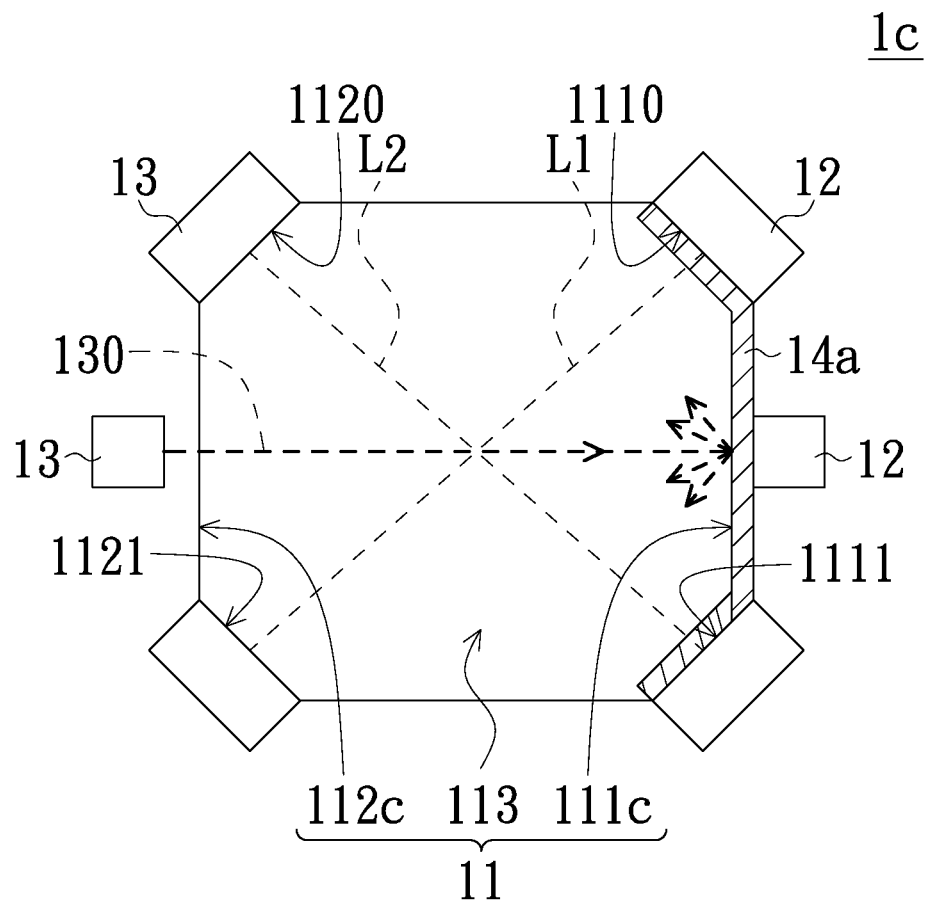
FIG. 7 is a schematic, top view of a back light module according to another embodiment of the present invention.

FIG. 7 is a schematic, top view of a back light module according to another embodiment of the present invention. Referring to FIG. 7, the back light module 1c in this embodiment is similar to the back light module 1a shown in FIGS. 4 and 5. In this embodiment, the light guide plate 11 is rectangular. The first light incident surface 111c of the light guide plate 11 includes a first corner 1110 and a third corner 1111. The second light incident surface 112c of the light guide plate 11 includes a second corner 1121 and a fourth corner 1120. The first corner 1110 of the first light incident surface 111c and the second corner 1121 of the second light incident surface 112c are respectively disposed at two ends of a diagonal line L1 of the light guide plate 11. The third corner 1111 of the first light incident surface 111c and the fourth corner 1120 of the second light incident surface 112c are respectively disposed at two ends of another diagonal line L2 of the light guide plate 11. The first light sources 12 are respectively disposed at the first corner 1110, the third corner 1111 and a position between the first corner 1110 and the third corner 1111. The second light sources 13 are respectively disposed at the second corner 1121, the fourth corner 1120 and a position between the second corner 1121 and the fourth corner 1120. That is to say, the first light source 12 disposed at the first corner 1111 corresponds to the second light source 13 disposed at the second corner 1120. The other elements of the back light module 1c in this embodiment are similar to the back light module 1a shown in FIGS. 4 and 5, and the detailed description is omitted.

Figure 8:
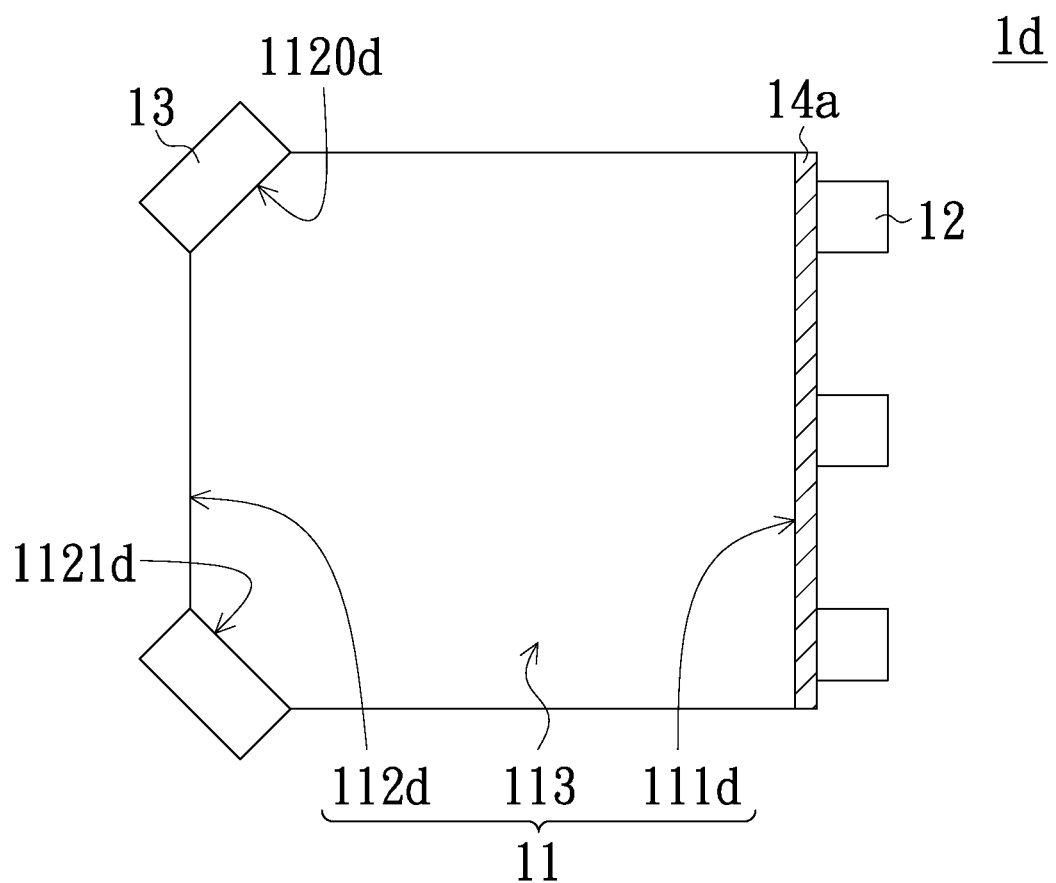
FIG. 8 is a schematic, top view of a back light module according to another embodiment of the present invention.

FIG. 8 is a schematic, top view of a back light module according to another embodiment of the present invention. Referring to FIG. 8, the back light module 1d in this embodiment is similar to the back light module 1a shown in FIGS. 4 and 5. In this embodiment, the second light incident surface 112d of the light guide plate 11 includes a second corner 1121d and a fourth corner 1120d. There are at least two second light sources 13. The second light sources 13 are respectively disposed at the second corner 1121d and the fourth corner 1120d of the second light incident surface 112d, while the first light sources 12 are disposed beside the first light incident surface 111d. The other elements of the back light module 1d in this embodiment are similar to the back light module 1a shown in FIGS. 4 and 5, and the detailed description is omitted.

Figure 9:
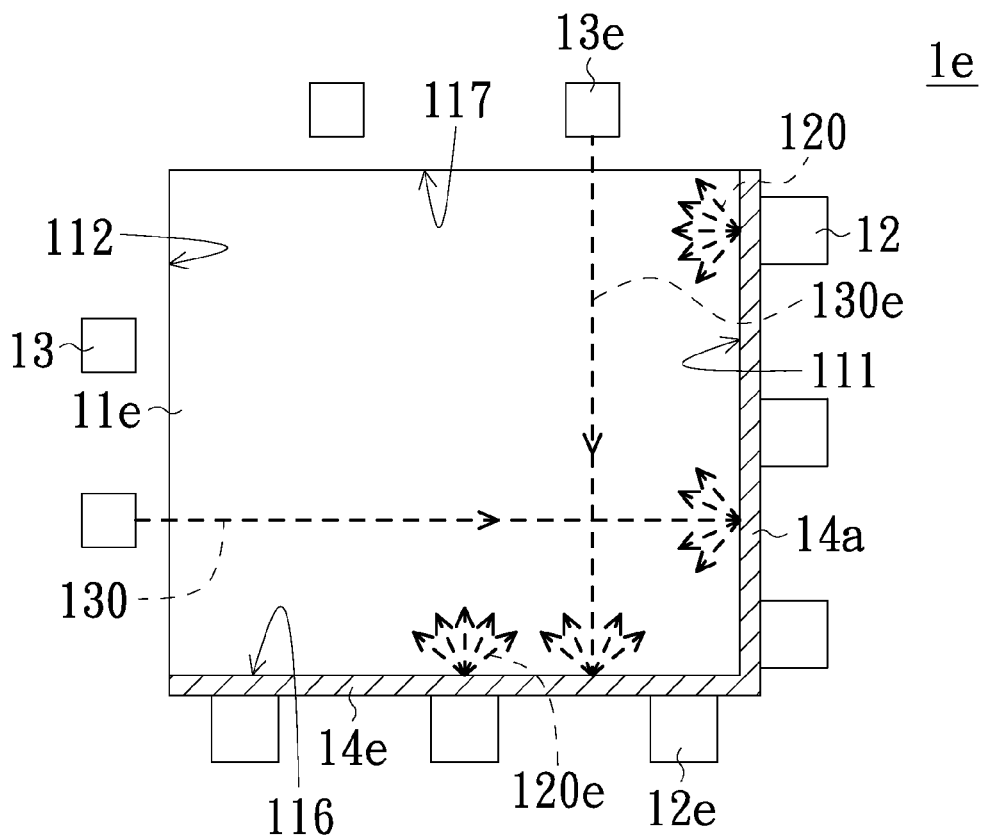
FIG. 9 is a schematic, top view of a back light module according to another embodiment of the present invention.

FIG. 9 is a schematic, top view of a back light module according to another embodiment of the present invention. Referring to FIG. 9, the back light module 1e in this embodiment is similar to the back light module 1a shown in FIGS. 4 and 5. In this embodiment, the back light module 1e further includes at least one third light source 12e, at least one fourth light source 13e and a second reflection element 14e. The light guide plate 11e further includes a third light incident surface 116 and a fourth light incident surface 117. The third light incident surface 116 connects the first light incident surface 111 and the second light incident surface 112. The fourth light incident surface 117 is opposite to the third light incident surface 116 and connects the first light incident surface 111 and the second light incident surface 112. The third light sources 12e are disposed beside the third light incident surface 116 and suitable to provide second non-collimated light beams 120e to the third light incident surface 116. The fourth light sources 13e are disposed beside the fourth light incident surface 117 and suitable to provide second collimated light beams 130e to the fourth light incident surface 117. The second reflection element 14e is disposed beside the fourth light incident surface 117 and suitable to reflect the second collimated light beams 130e emitted from the fourth light sources 13e so as to make the second collimated light beams 130e diverge. The other elements of the back light module 1e in this embodiment are similar to the back light module 1a shown in FIGS. 4 and 5, and the detailed description is omitted.

Figure 10:
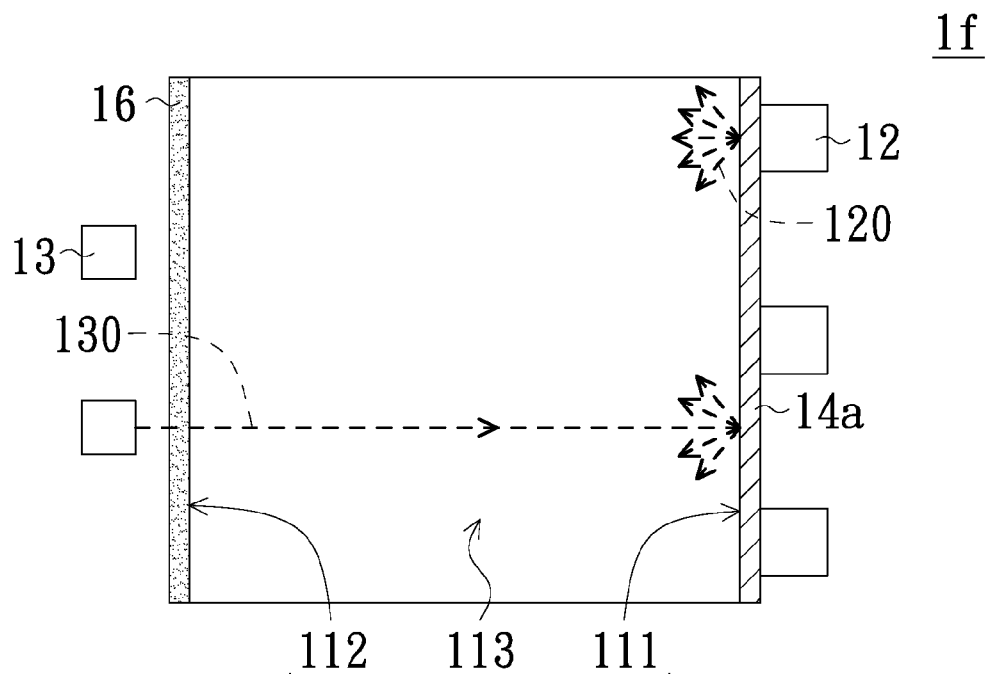
FIG. 10 is a schematic, top view of a back light module according to another embodiment of the present invention.

FIG. 10 is a schematic, top view of a back light module according to another embodiment of the present invention. Referring to FIG. 10, the back light module if in this embodiment is similar to the back light module 1a shown in FIGS. 4 and 5. In this embodiment, the back light module if further includes a light-converting structure 16. The light-converting structure 16 is disposed on the second light incident surface 112. The light-converting structure 16 may be made of phosphor, however, the invention is not limited thereto, the light-converting structure may also be made of quantum dots phosphor. The light-converting structure 16 is suitable to receive the first collimated light beam 130 emitted from the second light source 13 and convert a color of the first collimated light beam 130. For example, the original color of the first collimated light beam 130 emitted from the second light source 13 is blue, the light-converting structure 16 converts the color of part of the first collimated light beam 130 from blue to yellow after excited by the first collimated light beam 130. In another embodiment, the light-converting structure 16 may be coated on the first light incident surface 111 and the light emitting surface 113 of the light guide plate 11, or may be directly formed inside the light guide plate 11. The forming method of the light-converting structure 16 depends on the design requirement of the product, and the present invention is not limited to the above-mentioned methods.

Figure 11:
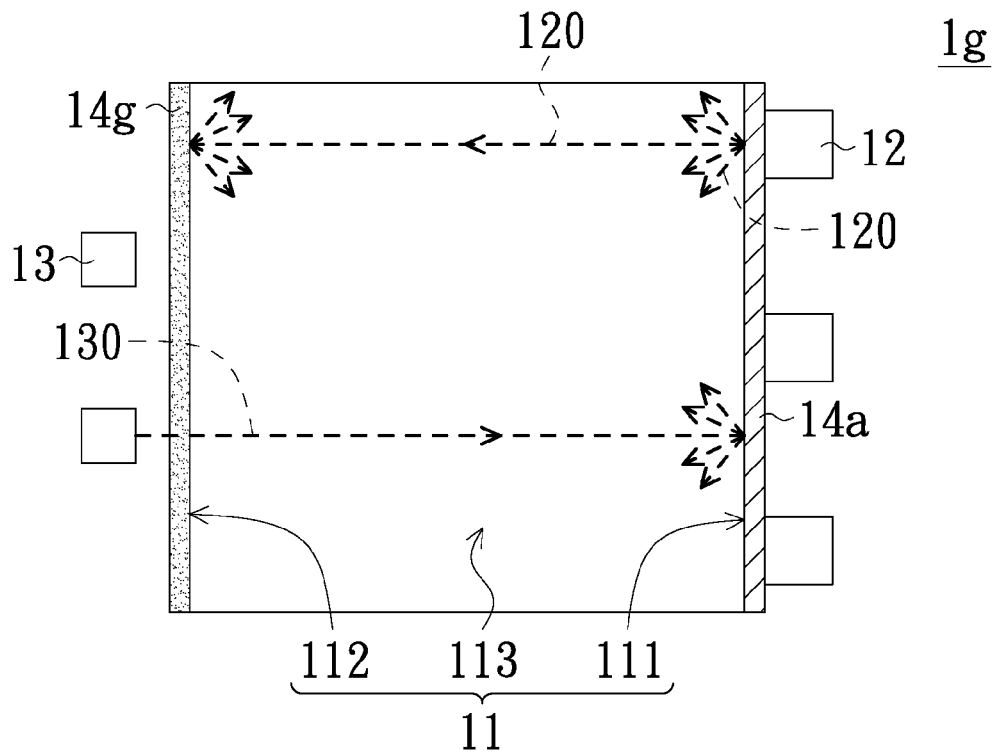
FIG. 11 is a schematic, top view of a back light module according to another embodiment of the present invention.

FIG. 11 is a schematic, top view of a back light module according to another embodiment of the present invention. Referring to FIG. 11, the back light module 1g in this embodiment is similar to the back light module 1a shown in FIGS. 4 and 5. In this embodiment, the back light module 1g further includes a third reflection element 14g. The third reflection element 14g is disposed beside the second light incident surface 112 of the light guide plate 11. The third reflection element 14g is suitable to reflect the first non-collimated light beams 120 emitted from the first light source 12. In this embodiment, the third reflection element 14g may be a single convex mirror or a convex micro mirror array composed of a plurality of convex micro mirrors. The third reflection element 14g is disposed above or under the second light sources 13. In another embodiment, there is a plurality of the third reflection elements 14g. Each third reflection element 14g is disposed between two adjacent second light sources 13, and the location of the third reflection element 14g is similar to that of the first reflection element 14 shown in FIG. 1. The other elements of the back light module 1g in this embodiment are similar to the back light module 1a shown in FIGS. 4 and 5, and the detailed description is omitted.

Figure 12:
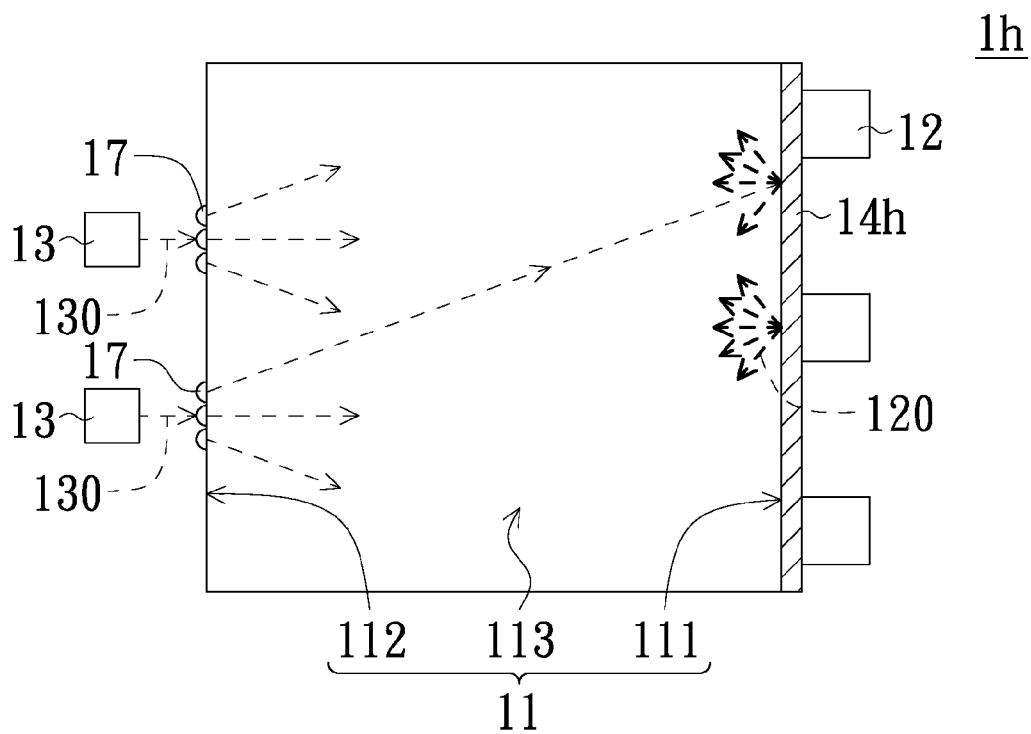
FIG. 12 is a schematic, top view of a back light module according to another embodiment of the present invention.
Figure 13:
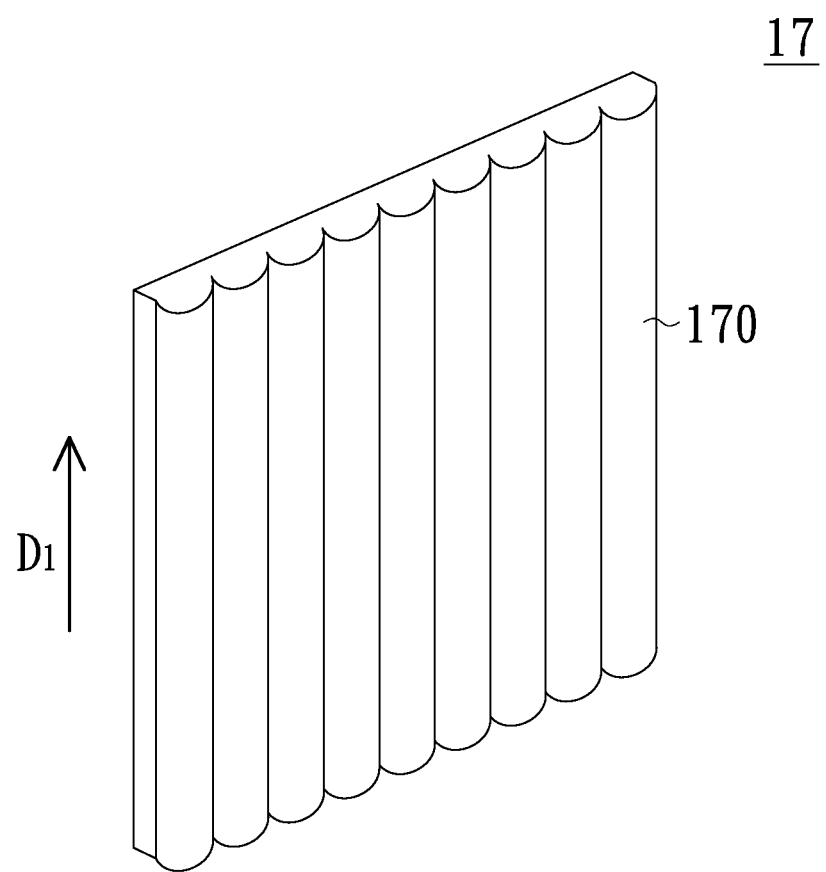
FIG. 13 is a schematic, three-dimensional view of an optical structure shown in FIG. 12.
Figure 14:
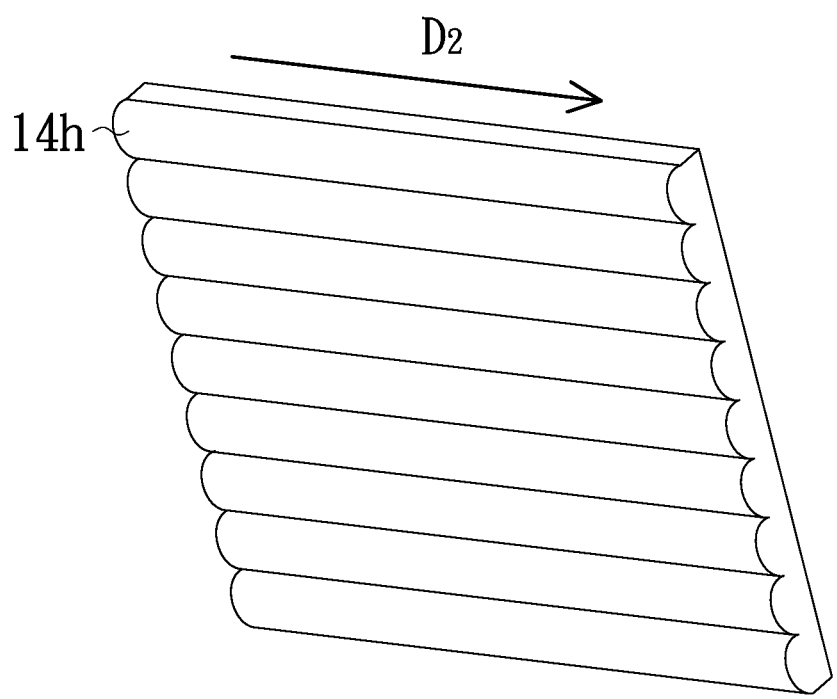
FIG. 14 is a schematic, three-dimensional view of a reflection element shown in FIG. 12.

FIG. 12 is a schematic, top view of a back light module according to another embodiment of the present invention. FIG. 13 is a schematic, three-dimensional view of an optical structure shown in FIG. 12. FIG. 14 is a schematic, three-dimensional view of a reflection element shown in FIG. 12. Referring to FIG. 12, the back light module 1h in this embodiment is similar to the back light module 1a shown in FIGS. 4 and 5. In this embodiment, the back light module 1h further includes a plurality of optical structures 17. In another embodiment, the number of the optical structure can be one. The optical structures 17 are disposed between the second light source 13 and the second light incident surface 112 of the light guide plate 11. Referring to FIG. 13, in this embodiment, each optical structure 17 includes a plurality of lenticular lenses 170. Each lenticular lens 170 extends along a first extension direction D1, wherein the first extension direction D1 is perpendicular to the light emitting surface 113. The optical structures 17 are suitable to receive the first collimated light beams 130 emitted from the second light sources 13 and make the first collimated light beams 130 diverge in the direction perpendicular to the first extension direction D1. Referring to FIG. 14, in this embodiment, the first reflection elements 14h may be stripe-shaped convex micro mirrors, and each first reflection element 14h extends along a second extension direction D2. The second extension direction D2 is parallel to the first light incident surface 111, and is perpendicular to first extension direction D1. The first reflection elements 14h are suitable to receive the first collimated light beams 130 diverged by the optical structures 17, and make the first collimated light beams 130 diverge again in the direction perpendicular to the second extension direction D2, so that the first collimated light beams 130 can be diverged uniformly in the light guide plate 11. The other elements of the back light module 1h in this embodiment are similar to the back light module 1a shown in FIGS. 4 and 5, and the detailed description is omitted. It is worth noting that, in this embodiment, a cross section shape of the optical structure 17 is not limited to the arc shape shown in FIG. 13, in other embodiments, the cross section shape of the optical structure 17 may be a V shape, a combination of a plane and an arc shape, or a combination of above-mentioned shapes. The shape of the optical structure 17 can be any shape that is capable of making the first collimated light beam 130 diverge, and is not limited to above.

Figure 15:
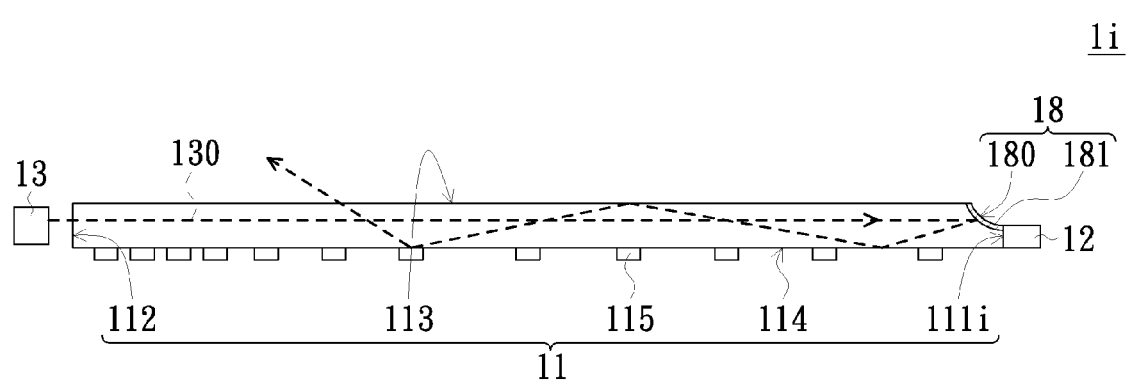
FIG. 15 is a schematic, cross-sectional view of a back light module according to another embodiment of the present invention.

FIG. 15 is a schematic, cross-sectional view of a back light module according to another embodiment of the present invention. Referring to FIG. 15, the back light module 1i in this embodiment is similar to the above-mentioned back light module. In this embodiment, the first reflection element 18 is not directly disposed on the first light incident surface 111i. The first reflection element 18 is concaved in the light guide plate 11 and connects the light emitting surface 113 and the first light incident surface 111i. The first reflection element 18 includes a concave surface 180 and a refection layer 181 coated on the concave surface 180. The concave surface 180 of the reflection element 18 is concaved into the light guide plate 11. The second light source 13 is disposed beside the second light incident surface 112 of the light guide plate 11 and corresponds the first reflection element 18. When the collimated light beam 130 emitted from the second light source 13 is transmitted to the first reflection element 18, the first reflection element 18 reflects the collimated light beam 130 to make the first collimated light beam 130 diverge. An advantage of the back light module 1i in this embodiment is that the first reflection element 18 could be integrally formed with the light guide plate 11, and it is no need to provide an extra reflection element. Thus, the manufacturing cost of the back light module 1i can be reduced.

In summary, the back light module, according to the embodiments of the present invention, has the first light source (e.g. the light emitting diode) and the second light source (e.g. the laser diode) respectively disposed beside two opposite surfaces (e.g. the first light incident surface and the second light incident surface) of the light guide plate. The first reflection element is disposed at a first light source side (i.e. beside the first light incident surface). The first collimated light beam emitted from the second light source is transmitted to the first light incident surface via the light guide plate, and then, the first collimated light beam is reflected by the first reflection element. The reflected first collimated light beam is diverged in the light guide plate so as to be uniformly mixed with the first non-collimated light beam emitted from the light emitting diode. Therefore, the back light module can provide the light with high and uniform brightness. In this configuration, the light emitting diode and the laser diode served as the light sources can be disposed beside a light guide plate simultaneously. Compared with the prior art, another light guide plate is omitted. In addition, in the embodiment of applying one light guide plate, a chromaticity variation caused by two overlap light guide plates having different luminance distribution is avoided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A back light module, comprising:
    a light guide plate including a first light incident surface, a second light incident surface opposite to the first light incident surface, a light emitting surface, and a bottom surface opposite to the light emitting surface, wherein the light emitting surface connects the first light incident surface and the second light incident surface, and the bottom surface connects the first light incident surface and the second light incident surface;
    at least one first light source disposed beside the first light incident surface, the first light source being suitable to provide a first non-collimated light beam to the first light incident surface;
    at least one second light source disposed beside the second light incident surface, the second light source being suitable to provide a first collimated light beam to the second light incident surface; and
    at least one first reflection element disposed beside the first light incident surface, wherein the first reflection element is suitable to reflect the first collimated light beam emitted from the second light source so as to make the first collimated light beam diverge,
    wherein the first reflection element is a convex micro mirror array.

2. The back light module as claimed in claim 1, wherein the first light source is a light emitting diode, and the second light source is a laser diode.

3. The back light module as claimed in claim 1, wherein the first light source is a light emitting diode, and the second light source is an assembly of a light emitting diode and a collimator lens.

4. The back light module as claimed in claim 1, wherein a number of the first light source is plurality, a number of the second light source is plurality, and at least one of the first light sources corresponds to one of the second light sources.

5. The back light module as claimed in claim 1, wherein a number of the first light source is plurality, a number of the second light source is plurality, there is a gap between two adjacent first light sources, and at least one of the second light sources corresponds to the gap.

6. The back light module as claimed in claim 1, wherein the light guide plate is rectangular, the first light incident surface comprises a first corner, the second light incident surface comprises a second corner, the first corner and the second corner are respectively disposed at two ends of a diagonal line of the light guide plate, the at least one first light source is disposed at the first corner, and the at least one second light source is disposed at the second corner.

7. The back light module as claimed in claim 6, wherein the first light incident surface further comprises a third corner, the second light incident surface further comprises a fourth corner, the third corner and the fourth corner are respectively disposed at two ends of another diagonal line of the light guide plate, a number of the first light source is two, a number of the second light source is two, the other first light source is disposed at the third corner, and the other second light source is disposed at the fourth corner.

8. The back light module as claimed in claim 1, wherein a number of the at least one second light source is greater than or equal to two, the light guide plate is rectangular, the second light incident surface has a second corner and a fourth corner, the second corner and the fourth corner are connected to the second light incident surface, and at least two of the second light sources are respectively disposed at the second corner and the fourth corner.

9. The back light module as claimed in claim 1, wherein the light guide plate further comprises a plurality of microstructures disposed on the bottom surface, and a distribution density of the microstructures is increased gradually along a direction from the first light incident surface toward the second light incident surface.

10. The back light module as claimed in claim 1, further comprising a light-converting structure disposed on the light guide plate, wherein the light-converting structure is suitable to receive the first collimated light beam emitted from the second light source and convert a color of the first collimated light beam.

11. The back light module as claimed in claim 10, wherein the light-converting structure comprises phosphor.

12. The back light module as claimed in claim 1, further comprising an optical structure, wherein the optical structure is disposed between the second light source and the second light incident surface, the optical structure comprises a plurality of lenticular lenses, a longitudinal direction of each lenticular lens is parallel to a first extension direction, a number of the first reflection element is plurality, each first reflection element is a stripe-shaped convex micro mirror, a longitudinal direction of each first reflection element is parallel to a second extension direction, the first extension direction is perpendicular to the light emitting surface, and the second extension direction is parallel to the second light incident surface and perpendicular to the first extension direction.

13. The back light module as claimed in claim 1, wherein the first reflection element includes a concave surface of the light guide plate and a refection layer coated on the concave surface, and the concave surface is concaved in the light guide plate and connected the light emitting surface and the second light incident surface.

14. The back light module as claimed in claim 1, wherein a number of the first reflection element is plurality, a number of the first light source is plurality, and each first reflection element is disposed between two adjacent first light sources.

15. The back light module as claimed in claim 1, further comprising:
   at least one third light source disposed beside a third light incident surface of the light guide plate, the at least one third light source being suitable to provide a second non-collimated light beam to the third light incident surface;
   at least one fourth light source disposed beside a fourth light incident surface of the light guide plate, the fourth light incident surface being opposite to the third light incident surface, the at least one fourth light source being suitable to provide a second collimated light beam to the fourth light incident surface, the third light incident surface connecting the first light incident surface and the second light incident surface, the fourth light incident surface connecting the first light incident surface and the second light incident surface; and
   at least one second reflection element disposed beside the third light incident surface, the second reflection element being suitable to reflect the second collimated light beam emitted from the fourth light source to make the second collimated light beam diverge.

16. The back light module as claimed in claim 15, wherein the third light source is a light emitting diode, and the fourth light source is a laser diode.

17. The back light module as claimed in claim 15, wherein the third light source is a light emitting diode, and the fourth light source is an assembly of a light emitting diode and a collimator lens.

18. The back light module as claimed in claim 15, wherein a number of the third light source is plurality, a number of the fourth light source is plurality, and at least one of the third light sources corresponds to one of the fourth light sources.

19. The back light module as claimed in claim 15, wherein a number of the third light source is plurality, a number of the fourth light source is plurality, there is a gap between two adjacent third light sources, and at least one of the fourth light sources corresponds to the gap.

20. The back light module as claimed in claim 15, wherein the second reflection element is a convex mirror.

21. The back light module as claimed in claim 15, wherein the second reflection element is a convex micro mirror array.

22. The back light module as claimed in claim 1, further comprising at least one third reflection element, wherein the third reflection element is disposed beside the second light incident surface, and the third reflection element is suitable to reflect the first non-collimated light beam emitted from the first light source.

23. The back light module as claimed in claim 22, wherein a number of the third reflection element is plurality, a number of the second light source is plurality, and each third reflection element is disposed between two adjacent second light sources.

24. The back light module as claimed in claim 22, wherein the third reflection element is a convex mirror.

25. The back light module as claimed in claim 22, wherein the third reflection element is a convex micro mirror array.

* * * * *